Patented June 3, 1941

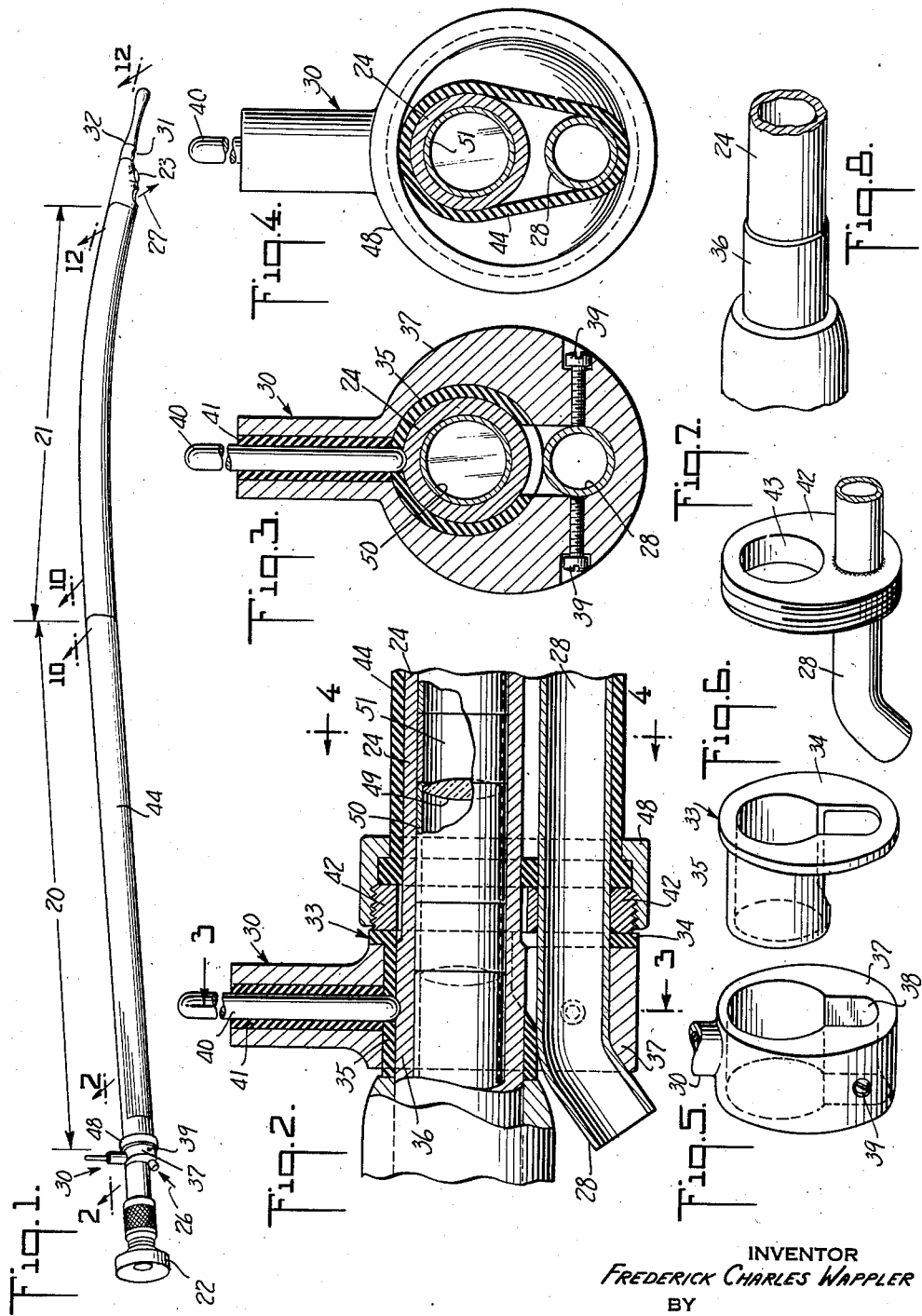

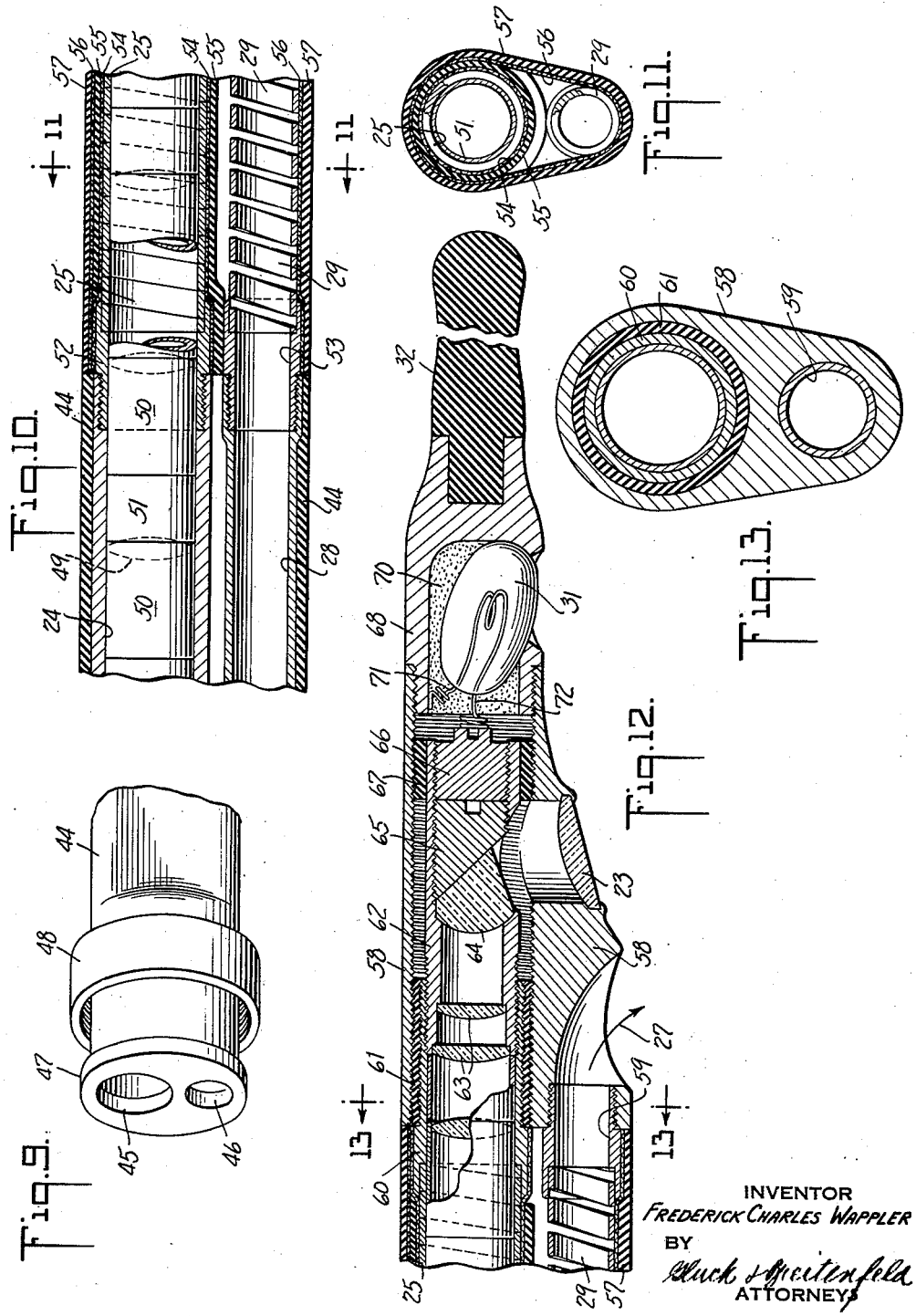

2,243,992

UNITED STATES PATENT OFFICE 2,243,992

FLEXIBLE OPERATING INSTRUMENT

Frederick Charles Wappler, New York, N. Y.

Application September 9, 1939, Serial No. 294,113

12 Claims. (Cl. 128—8)

My present invention relates generally to surgical instruments.

It is the general object to provide an operating instrument of the endoscopic type, embodying flexible qualities not heretofore present in such instruments.

While certain phases of my invention are of wider applicability, the present instrument is intended primarily for use as an operating gastroscope. For this reason, I have herein illustrated, and shall hereinafter describe, a preferred embodiment of the invention in the form of a practical flexible operating gastroscope.

By means of the present improved instrument, the interior of a body cavity, such as the stomach, is not only capable of examination under illuminated vision, but is also capable of being operated upon during a maintenance of the illuminated vision. In the case of the gastroscope herein described and illustrated, lesions of the stomach can be examined and operated upon, even in the relatively inaccessible pyloric region.

In an instrument having these general capabilities, it is necessary to maintain a compact and small cross-sectional area, to provide a flexible telescope, to provide an operative illuminating means, preferably an electric lamp, and to unify the various elements into a practical entity which embodies the requisite flexibility and adequately maintains the parts in proper and shielded relationship. My present invention successfully accomplishes this general objective and complies with these various fundamental requirements.

One of the features of the invention resides in the arrangement, side by side, of a flexible telescope tube and a flexible operating tube, with means retaining said tubes together as a flexible unit. In accordance with my invention, the operating tube has an outlet end adjacent to the objective of the telescope, and an illuminating means is provided in the forward end of the instrument for illuminating the operating field that is viewed by the objective.

It is a particular feature of my invention to employ an electric lamp at the forward end of the instrument, and to provide a means for transmitting electric current to and from said lamp through the telescope and operating tubes respectively.

More specifically, a preferred embodiment of the invention comprises telescope and operating tubes, each of which has a rearward portion that is relatively rigid and a forward portion of flexible construction, means being provided for retaining the rigid portions in fixed relation, and for retaining the flexible portions together as a flexible unit. Preferably, a relatively rigid shell is arranged at the forward end of the instrument, secured to both flexible tubes at their forward ends. One portion of this shell may comprise a housing for the telescope objective, while another portion may be shaped to define a continuation of, and an outlet end for, the operating tube.

The flexible portions of the tubes are preferably composed of helically wound material such as spring-metal, and it is a particular feature of the present invention to arrange the operating tube in longitudinally stretched condition relative to the telescope tube, whereby the flexible unit will bend with relative ease in the direction of the operating tube.

I achieve these general objects and advantages, and such other objects and advantages as may hereinafter appear or be pointed out, in the manner illustratively shown in the accompanying drawings in which—

Figure 1 is a perspective view of an instrument constructed in accordance with the present invention, Figure 2 is an enlarged cross-sectional view taken substantially along the line 2—2 of Figure 1, Figure 3 is a cross-sectional view taken substantially along the line 3—3 of Figure 2, Figure 4 is a cross-sectional view taken substantially along the line 4—4 of Figure 2, Figure 5 is a fragmentary perspective view of the binding post element, Figure 6 is a similar perspective view of an insulating bushing, Figure 7 is a similar fragmentary perspective view of the rear end of the operating tube, Figure 8 is a similar fragmentary perspective view of the rear end of the telescope tube, Figure 9 is a fragmentary perspective view of the rear end of the relatively rigid sheath, Figure 10 is an enlarged cross-sectional view taken substantially along the line 10—10 of Figure 1, Figure 11 is a cross-sectional view taken substantially along the line 11—11 of Figure 10, Figure 12 is an enlarged cross-sectional view taken substantially along the line 12—12 of Figure 1, and Figure 13 is a cross-sectional view taken substantially along the line 13—13 of Figure 12.

The instrument is shown as a whole in Figure 1, although neither this figure nor any of the other figures is intended to show accurate relative dimensions. The instrument is of an elongated character having a rearward portion 20 which is of relatively rigid character, and a forward portion 21 which is of flexible construction. Extending from the eye-piece 22 to the objective lens 23 is an optical viewing system, consisting essentially of a telescope tube. That portion which lies within the region 20 is of relatively rigid character and may consist of a metallic tube 24 (see Figure 10), while the portion lying within the flexible region 21 is preferably formed of a helical band of spring metal 25 (see Figure 10).

Extending from the arrow 26 to the arrow 27 is an operating tube which is arranged alongside of the telescope tube. That portion which lies within the relatively rigid region 20 may be composed of a metallic tube 28 (see Figure 10), while the portion lying within the flexible region 21 is preferably composed of a helical band of spring metal 29 (see Figure 10).

Near the rearward end of the instrument there is provided a binding post or electric terminal post 30 intended to receive connecting wires which supply current from a battery or the like. This current energizes an electric lamp 31 mounted near the forward end of the instrument.

At the extreme tip of the instrument there is preferably provided a soft flexible rubber finger 32, or the like, and the external contours of the instrument are smoothly continuous to facilitate insertion and removal of the instrument through the esophagus into the stomach.

Referring now to Figures 2-8, it will be observed that the telescope tube 24 passes through an insulating bushing 33. This bushing is shown by itself in Figure 6 and comprises the flange portion 34 and the eccentric sleeve portion 35. The bore through the sleeve portion 35 snugly accommodates the slightly enlarged portion 36 of the telescope tube 24.

Mounted on the bushing 33 is the cylindrical element 37, preferably of metal, from which the binding post 30 projects. The element 37 has a bore which snugly accommodates the sleeve 35, and this bore has a lateral extension 38 adapted to accommodate the rear end of the operating tube 28. Set screws 39 mounted in the element 37 clamp against opposite sides of the operating tube 28 and serve not only to rigidify the assembly but also to establish a firm electrical connection between the member 37 and the tube 28. This tube is thus in electrical connection with the outer portion of the binding post 30, and is insulated from the telescope tube by means of the bushing 33.

The inner portion 40 of the binding post is mounted in an insulating sleeve 41, and the portion 40 is held in engagement against the portion 36 of the telescope tube. One terminal of the binding post is thus in electrical connection with the telescope tube, while the other terminal of the binding post is in electrical connection with the operating tube 28.

Immediately in advance of the flange 34, the tube 28 carries the externally threaded disk 42, as shown most clearly in Figure 7. This disk is concentrically arranged with respect to the member 37 and the flange 34, and is provided with a bore 43 which permits passage therethrough of the telescope tube 24. This tube is however of slightly reduced diameter at this point and there is no contact between the telescope tube and the disk 42.

Forwardly of the disk 42 a relatively rigid insulating sheath 44 extends around both the telescope tube and the operating tube. This sheath has a cross-sectional contour preferably of the character shown in Figure 4. At its rear end (shown most clearly in Figure 9) it is provided with a bore 45 which snugly accommodates the telescope tube 24, and with a bore 46 which snugly accommodates the operating tube 28. The sheath 44 is of substantially circular cross-section at its rear end, and has the circular flange 47 which abuts the disk 42, whereby the internally threaded union member 48 may be screw-threaded onto the disk 42 as shown most clearly in Figure 2, thus holding the parts firmly together.

Throughout the length of the telescope tube, both in the relatively rigid and in the flexible portions thereof, suitable lenses are mounted. The optical system per se is not a particular feature of the present invention, and it therefore suffices to point out that each of a series of lenses 49 is mounted in an individual sleeve 50, these sleeves being preferably held in spaced but entirely unconnected relation by means of spacing sleeves 51. This successive arrangement of lens sleeves and spacing sleeves extends all the way through the flexible portion of the telescope, and thus serves to maintain the optical system in a continuously operative condition, notwithstanding the flexing of the telescope tube in the flexible region 21.

Referring now to Figure 10 it will be observed that the forward end of the relatively rigid tube 24 is internally threaded and is thus secured in engagement with the flexible portion 25, the latter being provided with a fitting 52 which is externally threaded. Similarly, the relatively rigid portion 28 of the operating tube is internally threaded and secured in this way to the flexible portion 29, the latter being provided with a fitting 53 for this purpose.

The two tubes are held in proper spaced and mutually insulated relationship, in the flexible region, by an arrangement of sheaths which is preferably of the character shown most clearly in Figures 10 and 11. Around the telescope tube 25 there is a fabric sheath 54, and around this there is a sheath 55 of flexible insulating material such as rubber. Extending around this sheath, and also around the operating tube 29 is a second fabric sheath 56, and enveloping this sheath is an outer sheath 57 of flexible insulating material such as rubber. The sheath 57 is so constructed and formed that it has an external contour forming a smooth continuation of the relatively rigid sheath 44. A portion of the sheath 55 lies between the telescope tube and the operating tube at the junction point, as shown in Figure 10.

It will be observed, from Figure 10, that the convolutions of the operating tube portion 29 are spaced from one another. The showing of Figure 10 may be somewhat exaggerated, but is intended to indicate that the tube 29 is longitudinally stretched, relative to the tube 25, when the two tubes are initially assembled in straight parallel relationship. The result is that the flexible unit within the region 21 flexes readily in the direction of the operating tube, i. e., in the direction of the objective lens 23.

Referring now to Figures 12 and 13, the forward ends of the tubes 25 and 29 are secured to the relatively rigid shell 58 which is preferably of metal. Thus, the forward end of the tube 29 is provided with an externally threaded fitting 59 which is screwed into engagement with a suitable opening in the shell 58. This opening is shaped to serve as a smooth continuation of, and outlet for the operating tube.

Similarly, the forward portion of the tube 25 is provided with the externally threaded fitting 60. On this fitting there is an insulating sleeve 61 which is externally threaded, this sleeve engaging within a suitable threaded opening in the shell 58. This shell is thus in electrical connection with the operating tube, and is in insulated relation to the telescope tube.

At the forward end of the fitting 60, it is internally threaded, whereby it receives the rear end of a telescope extension 62. This extension may contain telescope lenses 63, and accommodates the reflecting prism 64 which is so mounted that the light entering the objective lens 23 passes through this prism and is directed in a rearward direction through the telescope. The objective lens 23, as will be observed in Figure 12, is secured in suitable manner within the shell 58, preferably a short distance in advance of the outlet opening of the operating tube.

The prism 64 may be conveniently held in position in the manner shown in Figure 12, by means of a wedge shaped plug 65 screwed into the forward end of the telescope extension 62. Also screwed into this extension, so as to project from the forward end thereof, is the contact plug 66 by means of which electric current passes into the lamp. Around the forward end of the telescope extension 62 there is another insulating sleeve 67 which helps to maintain the telescope tube in insulated relation to the shell 58.

At the forward end of the shell 58, it is internally threaded, whereby it is adapted to receive a lamp assembly 68. The element 68 has a recess adapted to accommodate the lamp bulb 31. This bulb is held in position by means of cement 70, or the like, and the member 68 has an opening slightly in advance of the objective lens 23 through which the filament of the bulb is exposed, whereby light from this bulb illuminates the area which is viewed by the telescope, and in which the operation is to take place. One terminal 71 of the lamp filament is electrically connected to the lamp housing 68. By constructing this housing of metal, this terminal of the lamp filament is thus brought into electrical connection with the shell 58, and through the latter with the operating tube. The other terminal 72 of the lamp filament projects rearwardly from the lamp housing and engages with the contact plug 66, thus establishing electrical connection with the telescope tube.

In assembling the device, the flexible tube portions 25 and 29 are first associated with the shell 58. The various sheaths illustrated in Figure 11 are then applied, during which time the operating tube is longitudinally stretched by a slight degree. The rigid portion 28 of the operating tube is then screwed into position onto the fitting 53, and the disk 42 is brought into a position which aligns the bore 43 with the tube 25. The final procedure is to insert the rigid portion 24 of the telescope tube, and connect and tighten the parts at the rear end of the instrument.

The uses to which the instrument may be put will be obvious to those skilled in the art. So far as I am aware, there has never existed a practical instrument of flexible character permitting not only visual inspection for diagnostic purposes, but also simultaneous operating procedures under maintained illuminated vision. An instrument of this character, constructed as a gastroscope, is of unusual and highly desirable advantage to the surgeon.

In general, it will be understood that changes in the details, herein described and illustrated for the purpose of explaining the nature of my invention, may be made by those skilled in the art without departing from the spirit and scope of the invention as expressed in the appended claims. It is therefore intended that these details be interpreted as illustrative, and not in a limiting sense.

Having thus described my invention, what I claim as new and desire to secure by Letters Patent is:

1. In an operating instrument of the character described, a flexible telescope tube and a flexible operating tube arranged side by side, means retaining said tubes together as a flexible unit, said operating tube having an outlet end adjacent to the objective of said telescope, an electric lamp at the forward end of the instrument for illuminating the operating field viewed by said objective, and means for transmitting electric current to and from said lamp through said tubes respectively.

2. In an operating instrument of the character described, a flexible metallic telescope tube and a flexible metallic operating tube arranged side by side, means retaining said tubes together as a flexible unit with the tubes mutually insulated from each other, an electric lamp at the forward end of the instrument, and means connecting the lamp terminals to said tubes respectively so that the tubes themselves may serve to transmit electric current to and from said lamp.

3. In an operating instrument of the character described, a flexible metallic telescope tube and a flexible metallic operating tube arranged side by side, means retaining said tubes together as a flexible unit with the tubes mutually insulated from each other, an electric lamp at the forward end of the instrument, and means connecting the lamp terminals to said tubes respectively so that the tubes themselves may serve to transmit electric current to and from said lamp, said last-named means comprising a lamp housing having mutually insulated lateral and central terminals, and means for mounting said housing so that the lateral terminal is electrically connected to the operating tube while the central terminal is electrically connected to the telescope tube.

4. In an operating instrument of the character described, a flexible metallic telescope tube and a flexible metallic operating tube arranged side by side, means retaining said tubes together as a flexible unit with the tubes mutually insulated from each other, an electric lamp at the forward end of the instrument, and means connecting the lamp terminals to said tubes respectively so that the tubes themselves may serve to transmit electric current to and from said lamp; said last-named means comprising a metallic shell rigidly secured to both tubes but insulated from the telescope tube, a telescope tube extension arranged within said shell in insulated relation thereto, and a lamp housing mounted on said shell, said housing having mutually insulated lateral and central terminals one of which is electrically connected to said shell while the other is electrically connected to said telescope tube extension.

5. In an operating instrument of the character described, a flexible telescope tube and a flexible operating tube arranged side by side, and a relatively rigid shell secured to both tubes at their forward ends, one portion of said shell comprising a housing for the telescope objective, an adjacent portion being shaped to define a continuation of, and outlet end for, the operating tube.

6. In an operating instrument of the character described, a flexible telescope tube and a flexible operating tube arranged side by side, a relatively rigid shell secured to both tubes at their forward ends, one portion of said shell comprising a housing for the telescope objective, an adjacent portion comprising an outlet end for the operating tube, and a lamp housing mounted on said shell.

7. In an operating instrument of the character described, a flexible telescope tube and a flexible operating tube arranged side by side, a relatively rigid shell secured to both tubes at their forward ends, one portion of said shell comprising a housing for the telescope objective, an adjacent portion comprising an outlet end for the operating tube, a lamp housing mounted on the forward end of said shell, and a flexible finger projecting from the forward end of said lamp housing.

8. In an operating instrument of the character described, a telescope tube and an operating tube arranged side by side, the rearward portions of said tubes being relatively rigid and the forward portions of said tubes being of flexible construction, and means retaining said flexible portions together as a flexible unit; each flexible portion comprising a helically wound spring-metal band, the flexible portion of the operating tube being longitudinally stretched relative to the flexible portion of the telescope tube, whereby the flexible unit will bend more readily in the direction of the operating tube.

9. In an operating instrument of the character described, a telescope tube and an operating tube arranged side by side in mutually insulated relation, the rearward portions of said tubes being relatively rigid, the forward portions being of resilient flexible construction, a relatively rigid sheath carried by one of the rigid portions and ensheathing both rigid portions, a flexible sheath ensheathing both flexible portions and retaining them together as a flexible unit, said rigid and flexible sheaths having outer surfaces forming flush continuations of each other, a relatively rigid end assembly secured to the forward end of said flexible unit and having an outer surface forming a flush continuation of said sheath surfaces, an electric lamp mounted in said end assembly, and means connecting the lamp terminals to said tubes respectively so that the tubes themselves may serve to transmit electric current to and from said lamp.

10. In an operating instrument of the character described, a telescope tube and an operating tube arranged side by side in mutually insulated relation, the rearward portions of said tubes being relatively rigid, the forward portions being of resilient flexible construction, a relatively rigid sheath carried by one of the rigid portions and ensheathing both rigid portions, a flexible sheath ensheathing both flexible portions and retaining them together as a flexible unit, an electric binding post carried at the rear end of the instrument with its terminals electrically connected to said tubes respectively, and an electric lamp mounted on the forward end of the instrument with its terminals electrically connected respectively to said tubes, whereby the tubes themselves serve as insulated connectors between the terminals of the lamp and of the binding post.

11. In an operating instrument of the character described, a telescope tube and an operating tube arranged side by side, the rearward portions of said tubes being relatively rigid, the forward portions being of resilient flexible construction, a relatively rigid sheath carried by one of the rigid portions and ensheathing both rigid portions, and a flexible sheath ensheathing both flexible portions and retaining them together as a flexible unit, said rigid and flexible sheaths having outer surfaces forming flush continuations of each other.

12. In an operating instrument of the character described, a telescope tube and an operating tube arranged side by side, the rearward portions of said tubes being relatively rigid, the forward portions being of resilient flexible construction, a relatively rigid sheath carried by one of the rigid portions and ensheathing both rigid portions, a flexible sheath ensheathing both flexible portions and retaining them together as a flexible unit, said rigid and flexible sheaths having outer surfaces forming flush continuations of each other, and a relatively rigid end assembly secured to the forward end of said flexible unit and having an outer surface forming a flush continuation of said sheath surfaces, said end assembly comprising an objective for the telescope, an outlet end for the operating tube, and an electric lamp.

FREDERICK CHARLES WAPPLER.